(12) United States Patent
Ito et al.

(10) Patent No.: US 7,670,561 B2
(45) Date of Patent: Mar. 2, 2010

(54) MICRO FLUIDIC DEVICE AND JOINT THEREFOR

(75) Inventors: Yuzuru Ito, Tsuchiura (JP); Hidekazu Tsudome, Ryugasaki (JP); Yoshishige Endo, Tsuchiura (JP); Noriyuki Kawahara, Kawaguchi (JP); Naofumi Otsuki, Yabuki (JP); Masanobu Suzuki, Saitama (JP)

(73) Assignees: Hitachi Plant Technologies, Ltd. (JP); Enplas Corporation (JP)

(*) Notice: Subject to any disclaimer, the term of this patent is extended or adjusted under 35 U.S.C. 154(b) by 929 days.

(21) Appl. No.: 11/418,072

(22) Filed: May 5, 2006

(65) Prior Publication Data

US 2006/0257263 A1 Nov. 16, 2006

(30) Foreign Application Priority Data

May 13, 2005 (JP) ............................. 2005-140835

(51) Int. Cl.
*B01L 3/02* (2006.01)
(52) U.S. Cl. ...................................... 422/100
(58) Field of Classification Search ................. 422/100
See application file for complete search history.

(56) References Cited

FOREIGN PATENT DOCUMENTS

| JP | 10-506189 | 6/1998 |
|----|-----------|--------|
| JP | 2003-210963 | 7/2003 |
| JP | 2003-227780 | 8/2003 |

OTHER PUBLICATIONS

Japanese Official Action issued Nov. 4, 2009 for Patent Application No. 2006-140835. (Translation included).

*Primary Examiner*—Walter D Griffin
*Assistant Examiner*—Bobby Ramdhanie
(74) *Attorney, Agent, or Firm*—Antonelli, Terry, Stout & Kraus, LLP.

(57) ABSTRACT

A joint to be attached to a port of a micro fluidic element, has an outer peripheral surface of truncated subulate shape at a front end portion of the joint to form a front surface as a top of the truncated subulate shape, and a cuneiform space in an inside of the joint at the front end portion of the joint, the joint is made of an elastomer, and the cuneiform space includes a front end overlapping the front surface as seen in a direction along which a tube is guided by the cuneiform space when the tube is inserted into the joint so that the tube is enabled to penetrate the front surface through the front end.

20 Claims, 8 Drawing Sheets

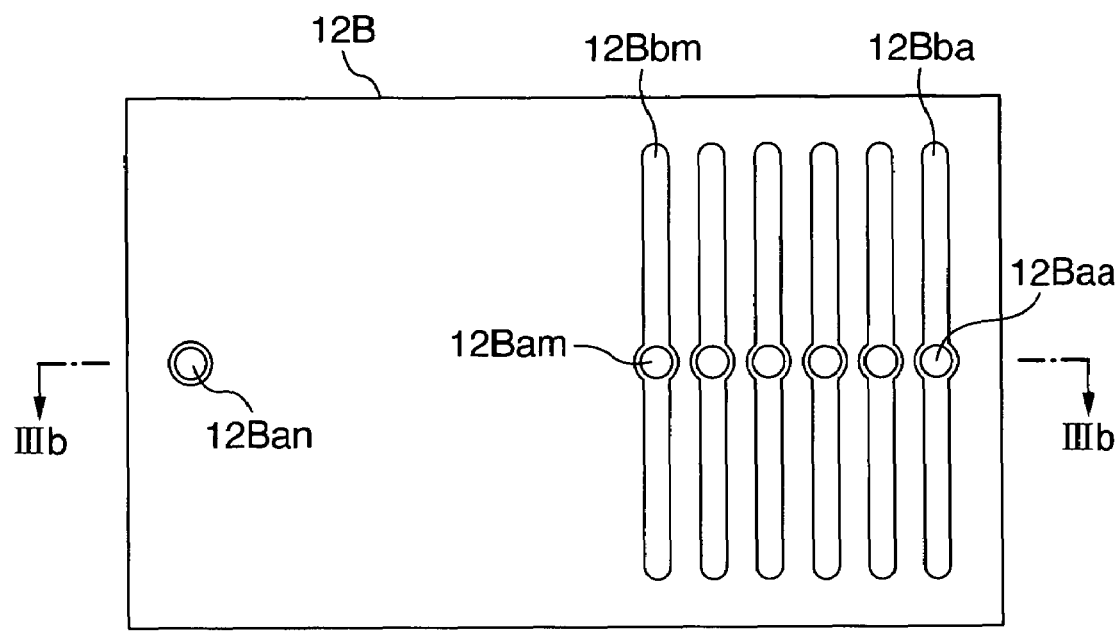
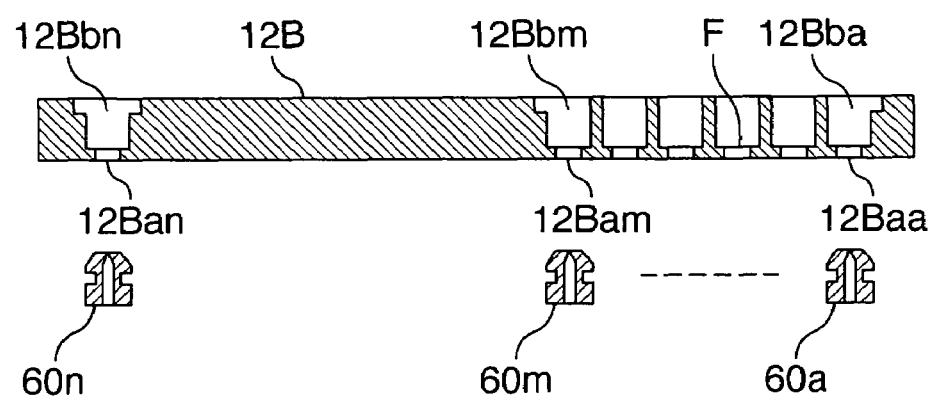

MICRO FLUIDIC DEVICE AND JOINT THEREFOR

CLAIM OF PRIORITY

The present application has a priority based on Japanese patent application No. 2005-140835 filed on May 13, 2005.

BACKGROUND OF THE INVENTION

The present invention relates to a micro fluidic device including a micro fluidic element adapted to receive a plurality of kinds of fluids which are different from each other and supplied from respective supply ports, to introduce the plurality of kinds of fluids into a micro fluidal passage so that the kinds of fluids are mixed with each other or made react to each other in the micro fluidal passage, and to discharge a desired resultant fluid from a discharge port at a downstream side with respect to the micro fluidal passage, a fluid feeding system for feeding the kinds of fluids to the respective supply ports of the micro fluidic element, and a fluid discharge system for receiving the desired resultant fluid from the discharge port of the micro fluidic element, and a joint therefor.

Such micro fluidic device in which the kinds of fluids different from each other are uniformly mixed with each other and/or made react to each other during a short time period while utilizing a specific physical phenomenon obtained by streaming the kinds of fluids through the micro fluidal passage of micro fluidic element having a thickness or width of about 100-200 μm, is called as a micro mixer or micro reactor, and is practically used in a limited field for immuno-analysis or chemical reaction (synthesis).

Although the micro mixer and micro reactor have a common basic structure of the micro fluidic element, the micro fluidic device for performing only the mixing is called as the micro mixer, and the micro fluidic device for performing both the mixing and reaction is called as the micro reactor.

The micro fluidic device is disclosed by JP-A-2003-210963.

BRIEF SUMMARY OF THE INVENTION

In the micro fluidic element, at least two kinds of fluids different from each other are mixed with each other or made react to each other by streaming the kinds of fluids through the micro fluidal passage called as a micro channel (or micro capillary) had having the thickness or width of about 100-200 μm so that a rate of an area of a boundary face between the kinds of fluids with respect to a cross sectional area of the micro fluidal passage is increased.

Accordingly, a diffusion between molecules on the boundary face is significantly accelerated (a time period for diffusion between molecules is proportion to square of a distance therebetween) to perform the mixing or reaction quickly, uniformly and continuously, and a time period and temperature for the reaction can be adjusted precisely, because the physical phenomenon occurs in the micro recess (micro fluidal passage).

A time period for the mixing or reaction is increased to increase a provability of that a by-product material other than the desired resultant substance is generated, when such operation is performed in a beaker or tank in which the rate of the area of the boundary face is small. Further, since a primary product material remains in the vessel for batch process, a great amount of the by-product material is produced by the reaction of the primary product material so that a producing efficiency decreases.

As described above, in the micro fluidic element in which a process in the micro recess (micro fluidal passage) is utilized, it is important to decrease a size of the micro recess with decreasing a size of the device.

A consideration regarding the supply of the liquid to the micro fluidic element from the outside and the discharge of the desired resultant liquid to the outside has not been sufficiently.

In the above prior art, a screw type joint used for pipe is miniaturized and is connected (joined) to the liquid feed system and discharge system through thread engagement.

The micro fluidic element needs to be exchanged in accordance with a change in kind of the liquid to be used for the mixing or reaction, so that the joint needs to be manually unscrewed and replaced by a substitute micro fluidic element at each time of the exchange of the micro fluidic element in the prior art, and it is preferable for the micro fluidic element to be made as small as possible to obtain a function and performance expected for the micro fluidic device, but a technique for connecting the micro fluidic element to the fluid feed system or discharge system is insufficient for miniaturizing desirably the micro fluidic element.

Therefore, an object of the present invention is to provide a micro fluidic device in which a micro fluidic element can be easily joined to a liquid feed or discharge system and be miniaturized.

Further, another object of the present invention is to provide a joint enabling the micro fluidic element to be easily joined to the liquid feed or discharge system and be miniaturized.

According to the invention, in a micro fluidic device to be fluidly connected to liquid supply tubes for transferring into the micro fluidic device a plurality of kinds of fluids different from each other, and to a liquid discharge tube for receiving from the micro fluidic device a resultant fluid formed by mixing at least two of the kinds of fluids with each other, including a micro fluidic element including supply ports for receiving respectively the kinds of fluids from the respective liquid supply tubes, a micro fluidal passage for mixing the at least two of the kinds of fluids with each other in the micro fluidal passage, and a discharge port for discharging the resultant fluid at a downstream side with respect to the micro fluidal passage, and joints attached respectively to the supply ports and discharge port so that the supply ports and discharge port are fluidly connected to the liquid supply tubes and the liquid discharge tube through the respective joints, each of the joints is made of an elastomer, has an outer peripheral surface of truncated subulate shape at a front end portion of the joint to form a front surface as a top of the truncated subulate shape, and has in an inside at the front end portion of the joint, a cuneiform space including a front end overlapping the front surface as seen in a direction along which corresponding one of the liquid supply tubes and the liquid discharge tube is guided by the cuneiform space when the corresponding one of the liquid supply tubes and the liquid discharge tube is inserted into the joint so that the corresponding one of the liquid supply tubes and the liquid discharge tube is enabled to penetrate the front surface through the front end.

According to the invention, in a joint to be attached to a port of a micro fluidic element for one of taking a fluid into the micro fluidic element from a liquid supply tube and discharging a resultant liquid formed by treating the liquid in the micro fluidic element to a liquid discharge tube from the micro fluidic element, comprising, an outer peripheral surface of truncated subulate shape at a front end portion of the joint to form a front surface as a top of the truncated subulate shape, and a cuneiform space in an inside of the joint at the front end portion of the joint, the joint is made of an elastomer, and the cuneiform space includes a front end overlapping the front surface as seen in a direction along which corresponding one of the liquid supply tube and liquid discharge tube is guided by the cuneiform space when the corresponding one of the liquid supply tube and liquid discharge tube is inserted into the joint so that the corresponding one of the liquid supply tube and liquid discharge tube is enabled to penetrate the front surface through the front end.

The front surface may be an oval flat surface, the outer peripheral surface may have a pair of oblique surfaces between which the front surface extends, the pair of oblique surfaces and the front surface may form the truncated subulate shape even when the other area of the outer peripheral surface other than the pair of oblique surfaces and the front surface has any shape, the front surfaces of the joints may face to the supply ports and discharge port respectively in the direction, each of the supply ports and discharge port may have a flange therein, and/or the each of the joints may have a groove engaging with the flange.

The joint may have a sealing film between the front surface and the front end to be penetrated when the corresponding one of the liquid supply tubes and the liquid discharge tube is inserted into the joint.

If the joint has a rib protruding on the outer peripheral surface perpendicularly to the direction and a longitudinal direction of the front end, a force for closing a hole formed by penetrating the front surface with the tube to receive the tube therein is increased by the rib increasing a rigidity of a portion of the joint surrounding the tube so that the hermetic sealing between the tube and the joint is stably kept when the tube extends through the front surface, that is, the hole is opened by the tube extending through the front surface.

If the joint has a pair of protrusions protruding in the direction at respective sides on the front surface opposite to each other through the front end in a longitudinal direction of the front end, an expansion of the hole in a longitudinal direction of the hole, that is, the longitudinal direction of the front end, is prevented against the insertion of the tube into the joint until extending through the front surface by the protrusions so that the hermetic sealing between the tube and the joint is stably kept when the tube extends through the front surface, that is, the hole is opened by the tube extending through the front surface.

It is preferable for keeping the hermetic sealing between the tube and the joint when the tube extends through the front surface, that is, the hole is opened by the tube extending through the front surface that the front end forms single line, that is, the hole forms the single line, when the tube has been removed from the joint or hole after the tube penetrates the front surface through the front end to form the hole. The protrusions may protrude with respect to a part of the front surface overlapping the front end as seen in the direction.

According to the invention, when the micro fluidic element is exchanged, a hermetic sealing in the joint or between the micro fluidic element and the liquid feed or discharge system can be maintained by only inserting into or pulling out from the joint mounted on the liquid supply or discharge port of the micro fluidic element the liquid supply or discharge tube, and the joint can be mounted on the liquid supply or discharge port of small diameter, so that the micro fluidic element can be easily connected to the liquid feed or discharge system, and the micro fluidic element can be miniaturized.

Other objects, features and advantages of the invention will become apparent from the following description of the embodiments of the invention taken in conjunction with the accompanying drawings.

BRIEF DESCRIPTION OF THE SEVERAL VIEWS OF THE DRAWINGS

FIG. 3*a* is a front view showing in detail a back lid of the micro fluidic device shown in FIG. 1.

FIG. 3*b* is a cross sectional view of the back lid.

DETAILED DESCRIPTION OF THE INVENTION

Hereafter, with making reference to the drawings, an embodiment of the invention is described.

Figure 1:
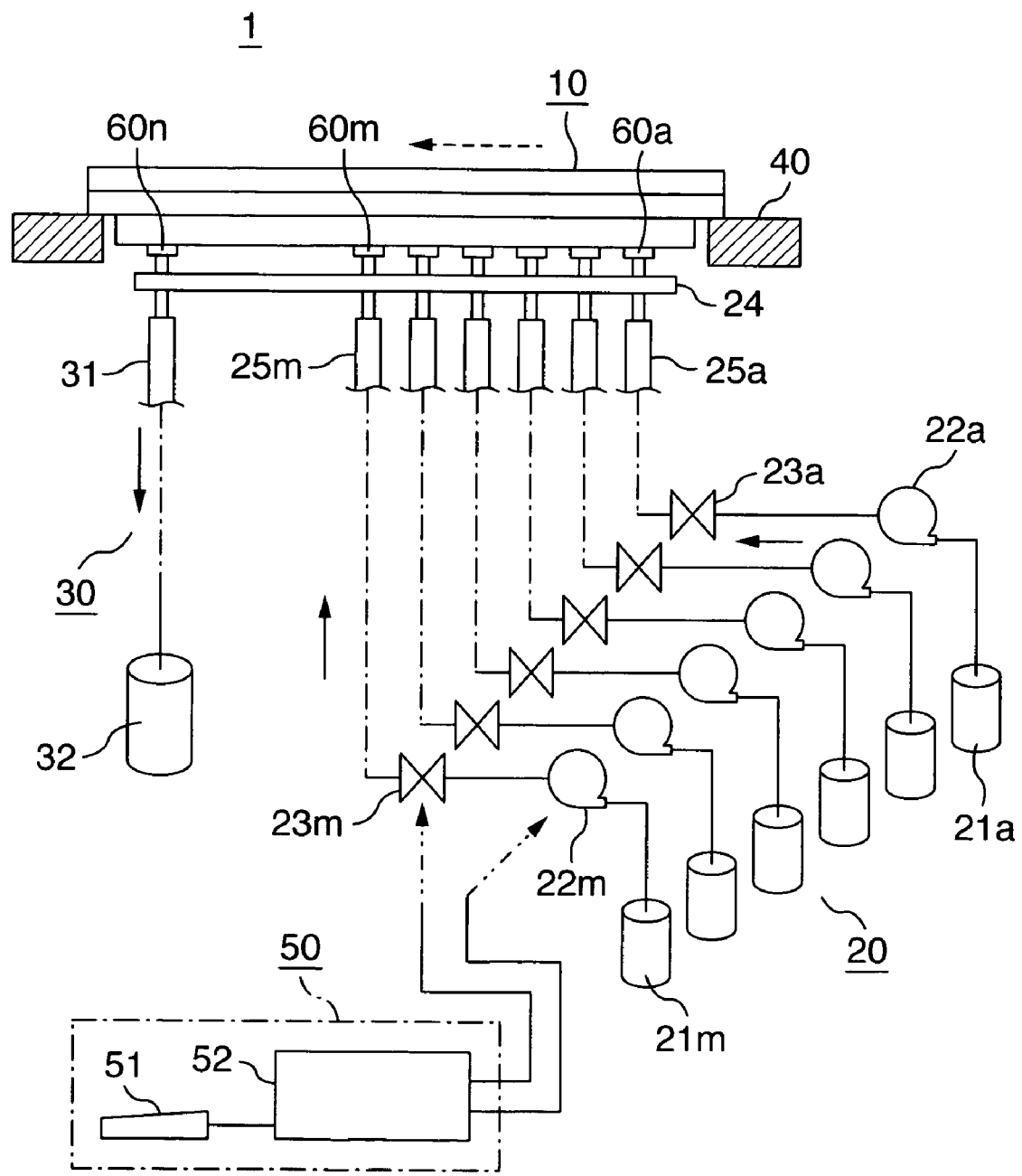
FIG. 1 is a view showing schematically a micro fluidic device of the invention.

FIG. 1 shows schematically an arrangement of a micro fluidic device 1 of the invention.

In FIG. 1, the micro fluidic device 1 has a micro fluidic element 10 including a plurality of liquid supply ports, a discharge port and a micro fluidal passage between the liquid supply ports and the discharge port, a liquid feed system 20, a liquid discharge system 30, a frame 40 for fixedly holding the micro fluidic element 10, a controller 50 for controlling the liquid feed system 20, and joints 60*a*-60*m* and 60*n* mounted on the liquid supply ports and discharge port to connect the micro fluidic element 10 to the liquid feed system 20 and the liquid discharge system 30.

An instruction data input by an operator through a key board 51 of the controller 50 is recorded in a control device 52 to be converted by the control device 52 so that the liquid feed system 20 is controlled in accordance with the converted instruction data.

The liquid feed system 20 has tanks 21*a*-21*m* for storing respective kinds of liquids different from each other, pumps 22*a*-22*m* for pumping the liquids from the respective tanks, electromagnetic valves 23*a*-23*m* to be connected, a liquid supply and discharge tube unit 24 including a plurality of liquid supply tubes and a liquid discharge tube to be inserted respectively into the joints 60*a*-60*m* and 60*n* mounted respectively on the plurality of liquid supply ports and the discharge port of the micro fluidic element 10, and a plurality of liquid supply pipes 25a-25m connecting the electromagnetic valves 23a-23m to the liquid supply tubes of the liquid supply and discharge tube unit 24.

The liquid discharge system 30 has a liquid discharge pipe 31 connected to the liquid discharge tube of the liquid supply and discharge tube unit 24 inserted in the joint 60n mounted on the discharge port of the micro fluidic element 10, and a tank 32 for storing the liquid discharged from the pipe 31.

The liquid supply pipes 25a-25m and liquid discharge pipe 31 are of fluorocarbon pipes superior in chemical resistance, and heads of the liquid supply tubes and liquid discharge tube are inserted into ends of the liquid supply pipes 25a-25m and liquid discharge pipe 31 to be connected.

By inserting the liquid supply tubes and liquid discharge tube of the liquid supply and discharge tube unit 24 into the joints 60a-60m and 60n mounted on the liquid supply ports and discharge port of the micro fluidic element 10, the micro fluidic element 10 is connected to the liquid supply system 20 and discharge system 30.

Hereafter, each structure will be explained in detail.

Figure 2A:
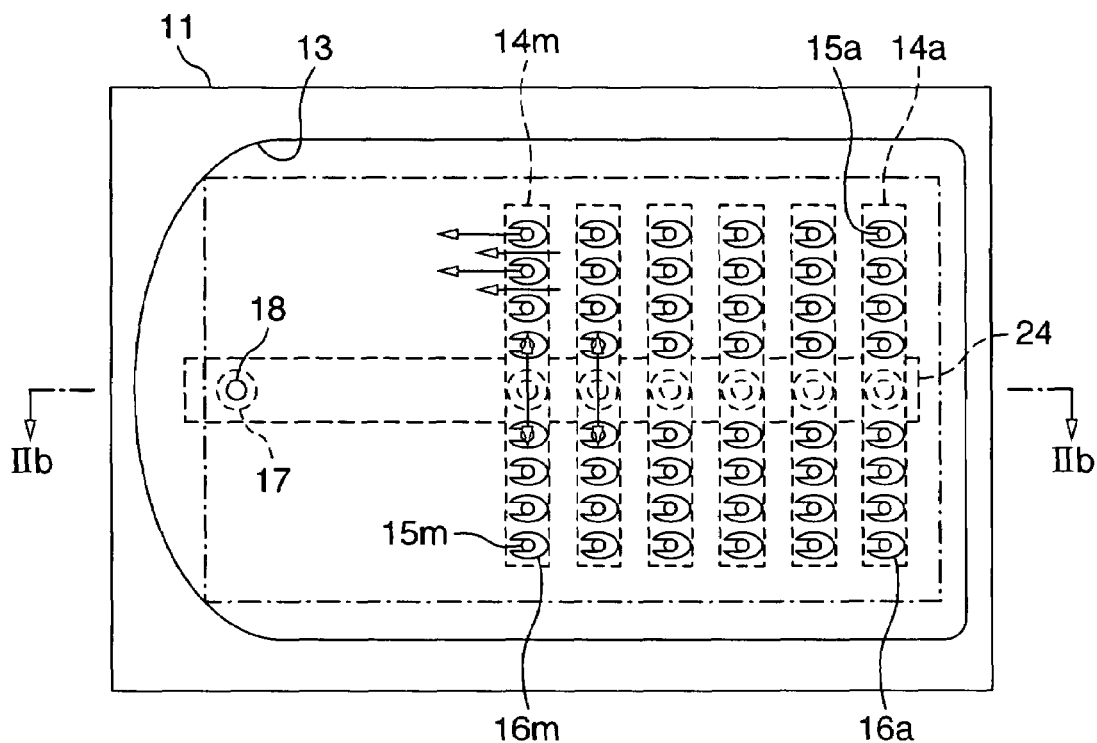
FIG. 2*a* is a front view showing in detail a micro fluidic element for the micro fluidic device shown in FIG. 1.
Figure 2B:
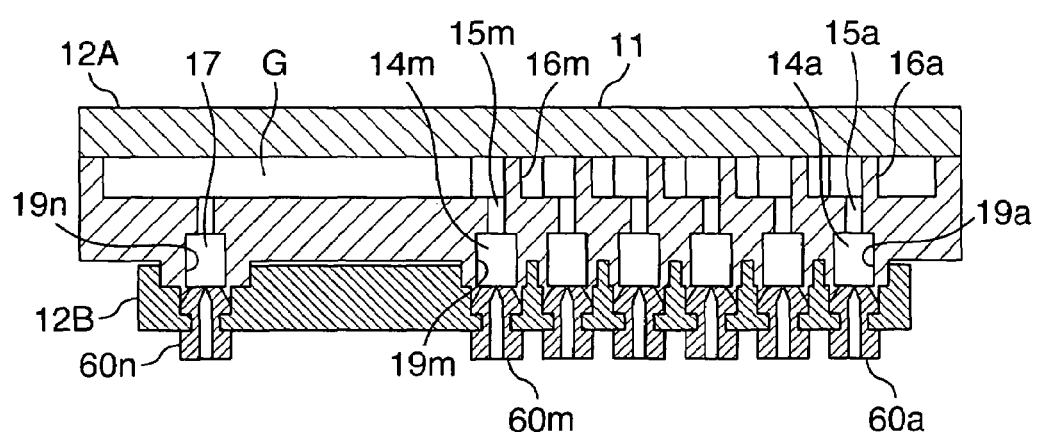
FIG. 2*b* is a cross sectional view of the micro fluidic element.

FIGS. 2a and 2b show the micro fluidic element 10, FIG. 2a is a plan view of a micro fluidic element body 11 of the micro fluidic element 10 from which a front lid 12A is detached and to which a back lid 12B and the liquid supply and discharge tube unit 24 shown in FIG. 1 are attached at a back surface thereof, and FIG. 2b is a cross sectional view taken along IIb-IIb line in FIG. 2a to shown the micro fluidic element body 11 from which the liquid supply and discharge tube unit 24 at the back surface is detached and to which the front lid 12A is attached.

In FIG. 2a, the micro fluidic element body 11 includes at an upper surface of a front side thereof a recess 13 having a depth of about 100 μm and a substantially rectangular shape whose left end is rounded. A plurality of dents 14a-14m distributed in an ordinate direction in FIG. 2a are arranged on a part of a lower surface of the micro fluidic element body 11 corresponding to an area from a right end of the recess 13 to a center thereof, and a plurality of holes 15a-15m are arranged to make the dents 14a-14m of the lower surface communicate with the recess 13 of the upper surface.

Flow restraining walls 16a-16m of horseshoe shape opening at left sides thereof are arranged around the holes 15a-15m respectively and extend from a bottom of the recess 13 to an upper end surface of the micro fluidic element body 11. Incidentally, in FIG. 2b, some of the flow restraining walls 16a-16m are not shown for explanation below.

A circular dent 17 is arranged on a part of a lower surface of the back side corresponding to an area of a left end of the recess 13, and a hole 18 is arranged to make the dent 17 communicate with the recess 13 of the upper surface.

Projections 19a-19m and 19n are arranged to on the lower surface of the micro fluidic element body 11 to surround the dents 14a-14m and 17. The back lid 12B has convex portions to be fitted on the projections to join easily the micro fluidic element body 11 and back lid 12B with each other. The projections 19a-19m are substantially elliptical, and the projection 19n is circular.

The joints 60a-60m and 60n are mounted on the back lid 12B, and the liquid supply and discharge tube unit 24 is inserted into the joints 60a-60m and 60n.

The flow restraining walls 16a-16m have upper end surfaces of the same height as the upper end surface of the micro fluidic element body 11 so that the front lid 12A mounted thereon and the recess 13 define a micro fluidal passage G of the depth of about 100 μm to perform in the micro fluidal passage G mixing or reaction between the kids of fluids supplied from the liquid supply system 20.

FIGS. 3a and 3b show the back lid 12B, FIG. 3a is a plan view, and FIG. 3b is a cross sectional view taken along IIIb-IIIb in FIG. 3a.

The back lid 12B has holes 12Baa-12Bam and 12Ban for positioning the joints 60a-60m and 60n on the dents 14a-14m and 17 of the micro fluidic element body 11. The holes 12Baa-12Bam and 12Ban are also used as liquid supply ports and discharge port of the micro fluidic element 10.

Incidentally, convex portions 12Bba-12Bbm and 12Bbn are fitted on the projections 19a-19m and 19n surrounding respectively the dents 14a-14m and 17 of the micro fluidic element body 11. The holes 12Baa-12Bam and 12Ban have inner diameters smaller than widths or inner diameters of the convex portions 12Bba-12Bbm and 12Bbn to form flanges F on the holes 12Baa-12Bam and 12Ban.

The joints 60a-60m and 60n have the identical shape, so hereafter are called as the joints 60, while the joints 60a-60m and 60n are used when being used independently.

Figure 4A:
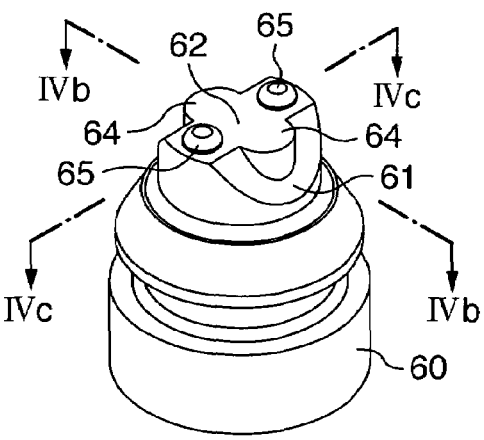
FIG. 4*a* is an oblique projection view showing a joint to be mounted on the back lid.
Figure 4B:
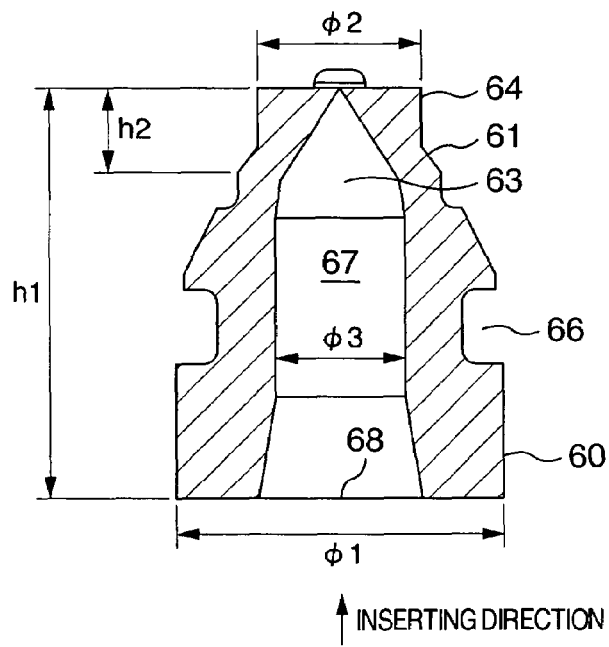
FIG. 4*b* is a cross sectional view of the joint.
Figure 4C:
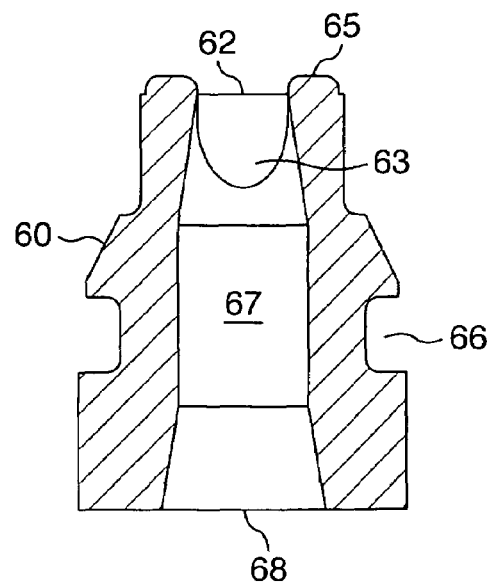
FIG. 4*c* is another cross sectional view of the joint.

FIGS. 4a-4c show the joints 60, FIG. 4a is an oblique projection view, FIG. 4b is a cross sectional view taken along IVb-IVb in FIG. 4a, and FIG. 4c is a cross sectional view taken along IVc-IVc in FIG. 4a.

The joints 60 are formed of a flexible material superior in chemical resistance, elasticity and liquid sealing characteristic, for example, silicone rubber or the like.

The joint 60 has, at a front end thereof, a tapered outer surface formed by a pair of oblique surfaces 61 and an elliptical flat surface 62 (or a top area 62 of a truncated subulate-shape of the front end outer surface of the joint) extending between the oblique surfaces 61, and an tapered inner space, that is, a cuneiform space 63, whose front end extends along the elliptical flat surface or top area 62 or overlaps the elliptical flat surface or top area 62 as seen in a tube moving direction in which the tube 25 or 31 is guided by the inside of the joint 60 to be moved in the joint 60 so that the tube 25 or 31 of the liquid supply or discharge tube unit is guided to the elliptical flat surface or top area 62 to penetrate the elliptical flat surface or top area 62. Protruding shoulder portions or ribs 64 are arranged on the oblique surfaces 61 to extend or project, as seen in the tube moving direction, in a direction oblique to a longitudinal direction of the elliptical flat surface or the front end of the tapered inner space (cuneiform space) 63 so that, as seen in the tube moving direction, a rigidity of each of sides of the elliptical flat surface or top area 62 opposite to each other through the front end of the tapered inner space in a direction perpendicular to the longitudinal direction of the front end of the tapered inner space against a deforming force in the direction perpendicular to the longitudinal direction of the elliptical flat surface or the front end of the tapered inner space is increased, and protrusions 65 are arranged on each of ends of the elliptical flat surface or top area 62 or on each of sides of the elliptical flat surface or top area 62 opposite to each other, as seen in the tube moving direction, in the longitudinal direction of the elliptical flat surface or the front end of the tapered inner space through the front end of the tapered inner space to prevent or restrain the front end of the tapered inner space from being extended after the front end of the tapered inner space is penetrated by the tube.

The joints 60 have grooves 66 at central areas of outer surfaces thereof so that the grooves 66 are fitted on the flanges F of the holes 12Baa-12Bam and 12Ban of the back lid 12B to mount the joints 60 on the back lid 12B. Therefore, the oblique surfaces 61, elliptical flat surface or top area 62, shoulder portions or ribs 64, protrusions 65 and so forth forming the front end of the joint 60 are inserted into the convex portions 12Bba-12Bbm and 12Bbn, and the protrusions 65 face to the holes 12Baa-12Bam and 12Ban as the liquid supply ports and discharge port of the micro fluidic element 10.

At a lower side of the tapered (cuneiform) space 63, a cylindrical space 67 slightly enlarged from the tapered space 63 is arranged, and a lower end of the cylindrical space 67 opens as an opening 68. Each of the liquid supply tubes and liquid discharge tube of the liquid supply and discharge tube unit 24 is inserted into the opening 68, and a thin film is formed between the front end of the tapered inner space 63 and the elliptical flat surface or top area 62 before the tube penetrate the elliptical flat surface or top area 62 so that the elliptical flat surface or top area 62 is formed by an upper surface of the thin film and the tapered inner space 63 is sealed by the thin film. Therefore, the thin film on the elliptical flat surface or top area 62 is called as a sealing film.

Next, the liquid supply and discharge tube unit 24 is explained.

Figure 5:
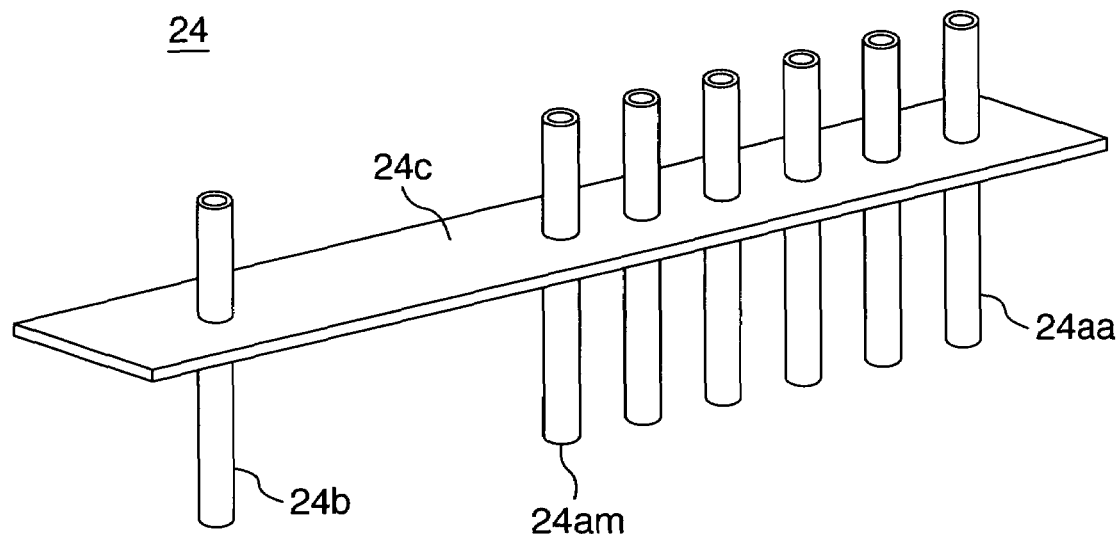
FIG. 5 is an oblique projection view showing in detail a liquid feed and discharge tube unit shown in FIG. 1.

FIG. 5 is an oblique projection view showing the liquid supply and discharge tube unit 24 including the liquid supply tubes 24aa-24am and liquid discharge tube 24b arranged to be aligned respectively with the joints 60a-60m and 60n, and a connecting member 24c of band shape connecting the tubes to each other.

Ends of the liquid supply tubes 24aa-24am and liquid discharge tube 24b are inserted respectively into the joints 60a-60m and 60n, and the other ends thereof are connected to the liquid supply pipes 25a-25m and discharge pipe 31.

Figure 6:
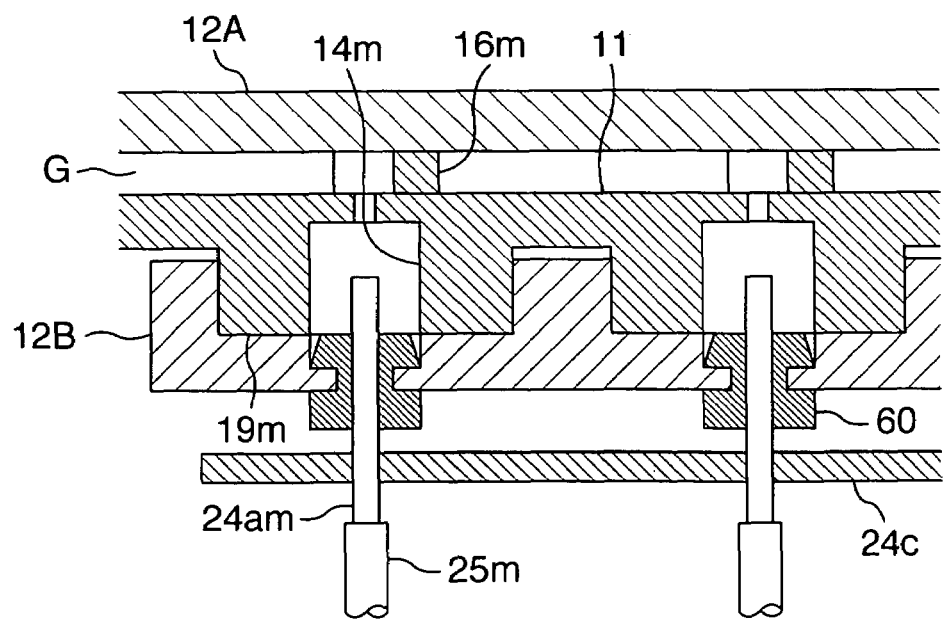
FIG. 6 is a cross sectional view showing a connection between the micro fluidic element shown in FIG. 2 and the liquid feed and discharge tube unit shown in FIG. 5.

FIG. 6 shows a case in which the liquid supply and discharge tube unit 24 is attached to the joints 60a-60m and 60n mounted on the back lid 12B. After the liquid supply tubes 24aa-24am and liquid discharge tube 24b of the liquid supply and discharge tube unit 24 are inserted respectively into the joints 60a-60m and 60n, the joints 60a-60m and 60n elastically clamp the liquid supply tubes 24aa-24am and liquid discharge tube 24b respectively to be prevented from being pulled out therefrom and to be hermetically sealed. Therefore, an additional member for fixing the liquid supply and discharge tube unit 24 to the micro fluidic element 10 is not necessary for uniting through one-touch operation the micro fluidic element 10 and the liquid supply and discharge tube unit 24 with each other.

With again making reference to FIG. 4, functions of the two oblique surfaces 61, elliptical flat surface or top area 62, shoulder portions or ribs 64, protrusions 65 and grooves 66 are explained.

At first, since the two oblique surfaces 61 form the tapered shape of the joint 60, the joint 60 can be easily mounted onto the back lid 12B by pushing it on a finger without using a special tool.

Figure 7:
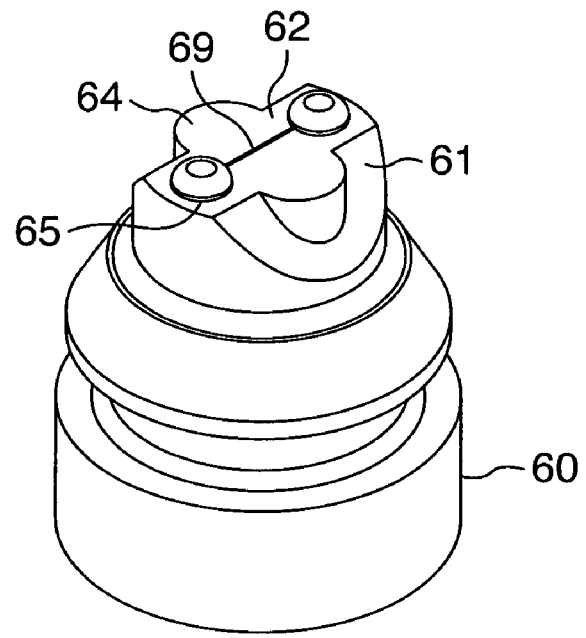
FIG. 7 is an oblique projection view showing a slit to be formed on the joint shown in FIG. 4.

The liquid feed system 20 is joined with the micro fluidic element 10 by inserting the liquid supply tubes 24aa-24am and liquid discharge tube 24b of the liquid supply and discharge tube unit 24 through openings 68 into the spaces 63 and 68 of the joints 60 to penetrate the sealing films of the elliptical flat surfaces or top areas 62, and subsequently by removing the liquid supply and discharge tube unit 24 from the joints, slits 69 of single line are formed on the elliptical flat surfaces or top areas 62 as a result of the penetration of the sealing films as shown in FIG. 7. A periphery of the slit 69 is elastically deformed by inserting the liquid supply and discharge tube unit 24 into the joint 60 to closely contact the liquid supply tubes 24aa-24am and liquid discharge tube 24b with being assisted by the shoulder portions or ribs 64 so that the liquid is prevented from leaking.

When a pressure of the liquid in the dents 14a-14m and dent 17 of the micro fluidic element body 11 acts on the two oblique surfaces 61, the pressure closes the slit 69 to prevent the liquid from leaking from the micro fluidic element 10 from which the liquid supply and discharge tube unit 24 is separated. Particularly, even when detachable one(s) of the liquid supply tubes 24aa-24amb are detached while the supply of liquid is kept through the other one(s) of the liquid supply tubes 24aa-24am, the leakage through the slit(s) is prevented.

The shoulder portions or ribs 64 act as an increased thickness for increasing a radially inward force to be applied to the slits in a slit opening direction (along the line IVc-IVc) when the liquid supply tubes 24aa-24am and liquid discharge tube 24b extend through the slits 69. Therefore, the forces for closing the slits 69 are increased to make the liquid supply tubes 24aa-24am and liquid discharge tube 24b and the slits 69 contact closely to prevent the liquid leakage when the liquid supply tubes 24aa-24am and liquid discharge tube 24b extend through the slits 69. Further, before inserting the liquid supply tubes 24aa-24am and liquid discharge tube 24b into the slits 69 and after pulling the liquid supply tubes 24aa-24am and liquid discharge tube 24b out of the slits, the radially inward forces to be applied to the slits prevent the liquid leakage or reverse flow.

The elastic force by a slit of lines crossing each other significantly smaller than the elastic force by the slit of single line deteriorates the close contact of the liquid supply tubes 24aa-24am and liquid discharge tube 24b against the slits so that the liquid leakage occurs. Further, since the forces for closing the slits of lines crossing each other from which slits the liquid supply tubes 24aa-24am and liquid discharge tube 24b are separated are small to allow the slits to be deformed by the liquid pressure in the dents 14a-14m and dent 17 of the back lid 12B so that the liquid leakage occurs, it is important for the slit 69 of the joint 60 to be of single line.

The protrusions 65 arranged on respective ends of the elliptical flat surfaces or top areas 62 prevent cracks from occurring on and extending from the ends of the slit 69 receiving therein respectively the liquid supply tubes 24aa-24am and liquid discharge tube 24b. Shapes of the slits 69 are kept unchanged by the protrusions 65 even after the liquid supply tubes 24aa-24am and liquid discharge tube 24b are inserted into the joints 60 repeatedly, so that a usable time period of the joints 60 can be elongated.

The grooves 66 at intermediate stages are formed to be fitted tightly on the flanges F to closely contact inner surfaces of the holes 12Baa-12Bam and 12Ban of the back lid 12B so that the liquid leakage is prevented, when being inserted into the holes 12Baa-12Bam and 12Ban of the back lid 12B.

In an example of the joint 60 as shown in FIGS. 4a-c, a total height h1 is 4.5 mm, a height h2 of the oblique surfaces 61 is 1 mm, an outer diameter $\phi 1$ is 4 mm, an outer diameter of front end $\phi 2$ is 2.5 mm, and an inner diameter $\phi 3$ of the space 67 is 1.6 mm.

It was confirmed that these joints 60 enable the liquid to be transferred into the micro fluidic elements 10 as shown by arrow marks of solid line and dot line without the liquid leakage, and a hermetical seal is kept without the liquid leakage at not more than 0.2 MPa when a water solution is transferred.

In FIG. 1, in response to inputting through a key board 51 data of kinds of and ratio between the liquids to be supplied to the micro fluidic element body 11 for a desired treatment, the control device 52 selects necessary one(s) of the pumps 22a-22m and determines rotational speed thereof. Further, necessary one(s) of the electromagnetic valves 23a-23m is selected to be instructed to be opened. Since the liquids need to be supplied simultaneously to the micro fluidic element body 11, the instructions for the selected one(s) of the pumps and one(s) of the electromagnetic valves are simultaneously output.

Consequently, as shown in FIG. 2a, in the holes 15a-15m, the desired liquids are injected into the dents 14a-14m from the liquid supply tubes 24aa-24am communicating with the opened one(s) of the electromagnetic valves 23a-23m as shown by the arrow mark of dot line. The injected liquids move in a direction along which the holes 15a-15m are aligned (a vertical direction in FIG. 2a) to fill the dents 14a-14m. Therefore, the liquids are distributed evenly for the holes 15a-15m so that the dents 14a-14m act as respective distributors for the liquids.

The liquids supplied into the recess 13 respectively from the holes 15a-15m are deflected toward the hole 18 as shown by the arrow mark of solid line by the flow restraining walls 16a-16m. Since the liquids flowing out respectively from the holes 15a-15m flow between the flow restraining walls 16a-16m at downstream side, the liquid flows are directed to be parallel to each other in the vicinity thereof so that a contact area between the liquids is increased.

Therefore, the micro fluidic element body 11 is formed by injecting a resin into a mold die for forming a monolithic combination of the flow restraining walls 16a-16m and projections 19a-19m and 19n, and the lid 12A is hermetically fixed to the upper end surface thereof to enable the recess 13 to act as the micro fluidal passage G for performing the specific physical phenomenon so that a desired result of the mixing and reaction is obtained.

The holes 15a-15m adjacent to each other (at upstream and downstream sides) may have a staggered arrangement so that the liquids flowing out of the holes 15a-15m respectively flow parallel to each other between the flow restraining walls 16a-16m at the downstream side.

The micro fluidic elements 10 do not need to be exchanged when the same liquids are used to be desirably treated with changing mixing ratio thereamong, but the micro fluidic elements 10 need to be exchanged to prevent another liquid from being used for the desired treatment when the another liquid to be used for another treatment different from the desired treatment is different from the liquids to be used for the desired treatment.

In this case, the liquid supply and discharge tube unit 24 is drawn out of the back lid 12B of the micro fluidic elements 10, another micro fluidic element 10 including another back lid 12B on which the other joints 60a-60m and 60n are mounted is prepared, and the liquid supply and discharge tube unit 24 is inserted into the other joints 60a-60m and 60n of the another micro fluidic element 10 so that the liquid feed system 20, liquid discharge system 30 and the another micro fluidic element 10 are combined with each other.

Since the liquid supply and discharge tube unit 24 keeps a fixed positional relationship among the joints 60a-60m and 60n mounted on the back lid 12B, orientations of the liquid supply tubes 24aa-24am do not need to be considered so that a time period for operation may be short and a skill is not needed.

Since the micro fluidic element 10 can be exchanged by separating the liquid supply and discharge tube unit 24 therefrom while the liquid feed system 20 and liquid discharge system 30 are unchanged, the micro fluidic element 10 can be miniaturized to improve a performance and function thereof.

Figure 8:
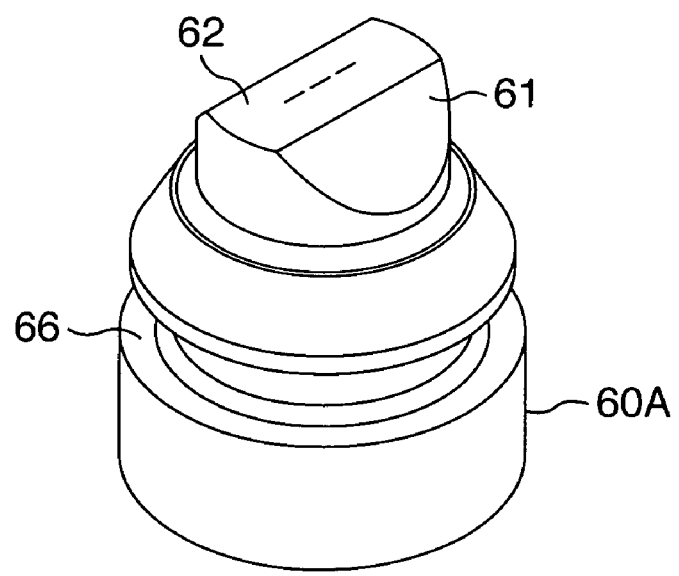
FIG. 8 is an oblique projection view showing another joint as a substitute for the joint shown in FIG. 4.

If the joint 60 is made of a material of superior crack extension resistance for preventing the slit 69 from being elongated by repeated inserting and withdrawing of the liquid supply and discharge tube unit 24, a joint 60A as shown in FIG. 8 and not including the shoulder portions or ribs 64 and protrusions 65 may be used.

The joint 60A as shown in FIG. 8 and not including the shoulder portions or ribs 64 and protrusions 65 is an original shape of the joint 60 shown ins FIGS. 4a-4c, and has also the pair of oblique surfaces 61, elliptical flat surface or top area 62 and groove 66.

Incidentally, a dot line on the elliptical flat surface or top area 62 shows a position of the slit of single line formed by penetrating the sealing film with the liquid supply tubes 24aa-24am and liquid discharge tube 24b.

Figure 9:
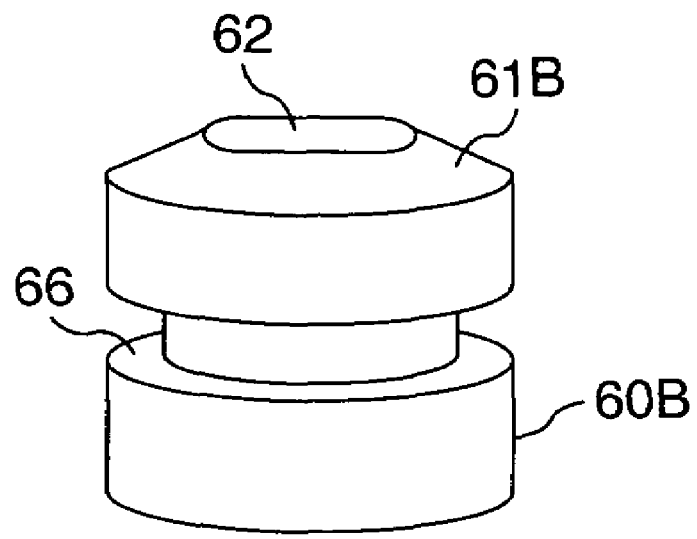
FIG. 9 is an oblique projection view showing another joint as a substitute for the joint shown in FIG. 4.

FIG. 9 shows a joint 60B modified from the joint 60.

The joint 60B has a truncated conical outer surface 61B with the elliptical flat surface or top area 62 as a top of the truncated conical shape (formed by cutting transversely a peak portion of a conical shape), a wedge shaped inner (cuneiform) space whose front end extends along the elliptical flat surface or top area 62 (overlaps the elliptical flat surface or top area 62 as seen in the inserting direction of the joint), the groove 66 between the sides of the identical outer diameter, and the sealing film on the elliptical flat surface or top area 62 (along the front end of the wedge shaped inner space) to be penetrated by the liquid supply tubes 24aa-24am and liquid discharge tube 24b.

The joint 60B is mounted on the back lid 12B with fitting the groove 66 onto the flange F of the back lid 12B. Subsequently, the liquid supply and discharge tube unit 24 is inserted into the wedge shaped inner space to penetrate the elliptical flat surface or top area 62 so that a front end thereof projects from the elliptical flat surface or top area 62.

Since the joint 60B has a taped front end, a thickness on the wedge shaped inner space at a position corresponding to the shoulder portions or ribs 64 as shown in FIGS. 4a-4c is great to increase an elastic force so that a strong contact with the liquid supply and discharge tube unit 24 and a strong sealing by the slit are obtained.

Figure 10:
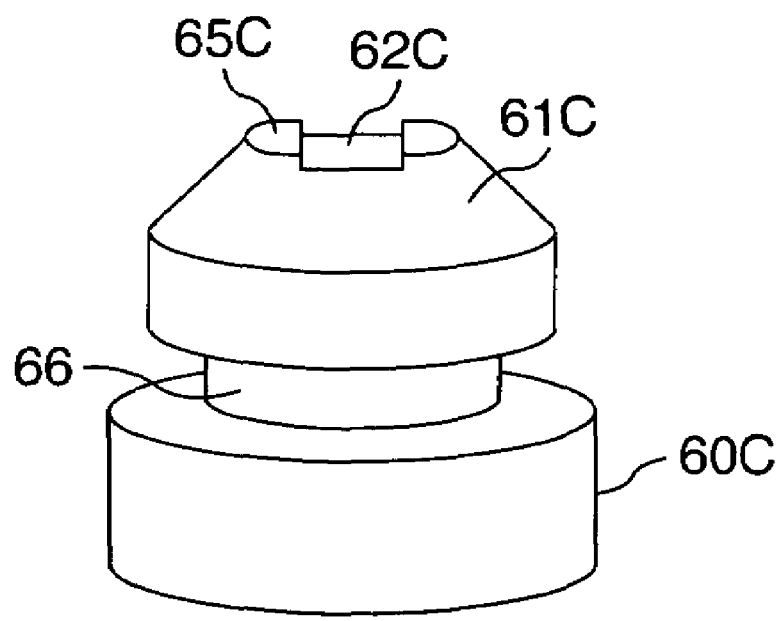
FIG. 10 is an oblique projection view showing another joint as a substitute for the joint shown in FIG. 9.

Further, FIG. 10 shows a joint 60C modified from the joint 60B and having a rectangular flat surface or top area 62C as a top area of a truncated conical outer surface 61C fallen from an elliptical flat surface at a middle position of the elliptical flat surface to form at both sides of the rectangular flat surface or top area 62C projections 65C corresponding to the projections 65. As shown in FIG. 10, a diameter of a front side of the groove 66 is slightly smaller than a diameter of a rear side of the groove 66 to be easily inserted into the holes 12Baa-12Bam and 12Ban of the back lid 12B.

The projections 65C improve a crack extension resistance of the slit on the rectangular flat surface or top area 62C against repeated inserting and withdrawing the liquid supply and discharge tube unit 24.

FIG. 10 shows a back lid 12C modified from the back lid 12B.

Figure 11A:
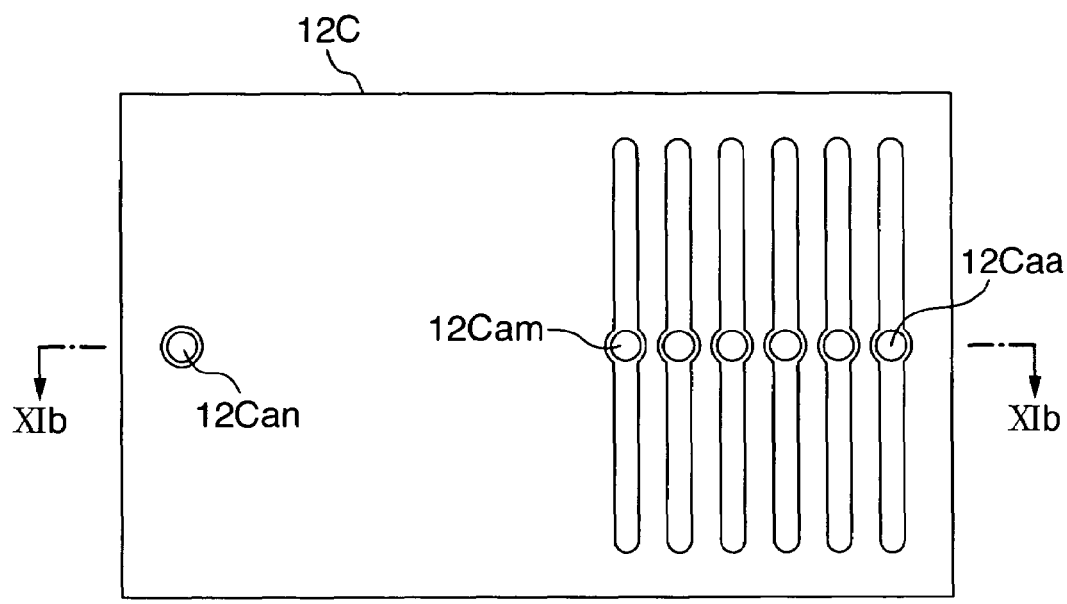
FIG. 11*a* is a front view showing another back lid as a substitute for the back lid shown in FIG. 3.
Figure 11B:
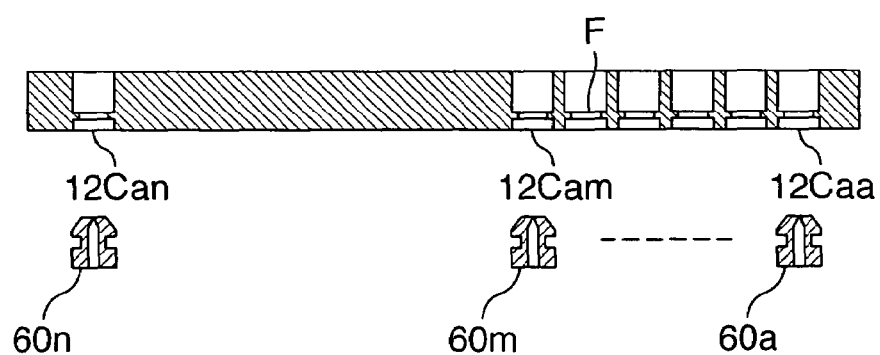
FIG. 11*b* is a cross sectional view showing the another back lid of FIG. 11*a*.

The back lid 12C has the same shape as the back lid 12B shown in FIG. 3a, but the flanges F in liquid supply holes 12Caa-12Cam and liquid discharge hole 12Can are arranged between the upper and lower surfaces of the back lid 12C as shown in FIG. 11b taken along line XIb-XIb in FIG. 11a, to easily insert thereinto the joints 60a-60m and 60m.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A micro fluidic device to be fluidly connected to liquid supply tubes for transferring to the micro fluidic device a plurality of kinds of fluids different from each other, and to a liquid discharge tube for receiving from the micro fluidic device a resultant fluid formed by mixing at least two of the kinds of fluids with each other, comprising, a micro fluidic element including supply ports for receiving respectively the kinds of fluids from the respective liquid supply tubes, a micro fluidal passage for mixing the at least two of the kinds of fluids with each other in the micro fluidal passage, and a discharge port for discharging the resultant fluid at a downstream side with respect to the micro fluidal passage, and joints attached respectively to the supply ports and discharge port so that the supply ports and discharge port are fluidly connected to the liquid supply tubes and the liquid discharge tube through the respective joints, wherein each of the joints is made of an elastomer, has an outer peripheral surface of truncated subulate shape at a front end portion of the joint to form a front surface as a top of the truncated subulate shape, and has in an inside at the front end portion of the joint, a cuneiform space including a front end overlapping the front surface as seen in a direction along which corresponding one of the liquid supply tubes and the liquid discharge tube is guided by the cuneiform space when the corresponding one of the liquid supply tubes and the liquid discharge tube is inserted into the joint so that the corresponding one of the liquid supply tubes and the liquid discharge tube is enabled to penetrate the front surface through the front end.

2. A micro fluidic device according to claim 1, wherein the front surface is an oval flat surface.

3. A micro fluidic device according to claim 1, wherein the outer peripheral surface has a pair of oblique surfaces between which the front surface extends.

4. A micro fluidic device according to claim 3, wherein the pair of oblique surfaces and the front surface form the truncated subulate shape.

5. A micro fluidic device according to claim 1, wherein the front surfaces of the joints face the supply ports and discharge port respectively in the direction along which corresponding one of the liquid supply tubes and the liquid discharge tube is guided by the cuneiform space when the corresponding one of the liquid supply tubes and the liquid discharge tube is inserted into the joint so that the corresponding one of the liquid supply tubes and the liquid discharge tube is enabled to penetrate the front surface through the front end.

6. A micro fluidic device according to claim 1, wherein each of the supply ports and discharge port has a flange therein, and the each of the joints has a groove engaging with the flange.

7. A micro fluidic device according to claim 1, wherein the each of the joints has a sealing film between the front surface and the front end to be penetrated when the corresponding one of the liquid supply tubes and the liquid discharge tube is inserted into the joint.

8. A micro fluidic device according to claim 1, wherein the each of the joints has a rib protruding on the outer peripheral surface perpendicularly to a longitudinal direction of the front end and the direction along which corresponding one of the liquid supply tubes and the liquid discharge tube is guided by the cuneiform space when the corresponding one of the liquid supply tubes and the liquid discharge tube is inserted into the joint so that the corresponding one of the liquid supply tubes and the liquid discharge tube is enabled to penetrate the front surface through the front end.

9. A micro fluidic device according to claim 1, wherein the each of the joints has a pair of protrusions protruding at respective sides on the front surface opposite to each other through the front end in a longitudinal direction of the front end, in the direction along which corresponding one of the liquid supply tubes and the liquid discharge tube is guided by the cuneiform space when the corresponding one of the liquid supply tubes and the liquid discharge tube is inserted into the joint so that the corresponding one of the liquid supply tubes and the liquid discharge tube is enabled to penetrate the front surface through the front end.

10. A micro fluidic device according to claim 1, wherein the front end forms single line.

11. A joint to be attached to a port of a micro fluidic element for one of taking a fluid into the micro fluidic element from a liquid supply tube and discharging a resultant liquid formed by treating the liquid in the micro fluidic element to a liquid discharge tube from the micro fluidic element, comprising, an outer peripheral surface of truncated subulate shape at a front end portion of the joint to form a front surface as a top of the truncated subulate shape, and a cuneiform space in an inside of the joint at the front end portion of the joint, wherein the joint is made of an elastomer, and the cuneiform space includes a front end overlapping the front surface as seen in a direction along which corresponding one of the liquid supply tube and liquid discharge tube is guided by the cuneiform space when the corresponding one of the liquid supply tube and liquid discharge tube is inserted into the joint so that the corresponding one of the liquid supply tube and liquid discharge tube is enabled to penetrate the front surface through the front end.

12. A joint according to claim 11, wherein the front surface is an oval flat surface.

13. A joint according to claim 11, wherein the outer peripheral surface has a pair of oblique surfaces between which the front surface extends.

14. A joint according to claim 13, wherein the pair of oblique surfaces and the front surface form the truncated subulate shape.

15. A joint according to claim 11, wherein the joint has a sealing film between the front surface and the front end to be penetrated when the corresponding one of the liquid supply tube and liquid discharge tube is inserted into the joint.

16. A joint according to claim 11, wherein the joint has a rib protruding on the outer peripheral surface in another direction perpendicular to a longitudinal direction of the front end and the direction along which corresponding one of the liquid supply tubes and the liquid discharge tube is guided by the cuneiform space when the corresponding one of the liquid supply tubes and the liquid discharge tube is inserted into the joint so that the corresponding one of the liquid supply tubes and the liquid discharge tube is enabled to penetrate the front surface through the front end.

17. A joint according to claim 16, wherein the joint has a pair of the ribs opposite to each other through the front end in the another direction.

18. A joint according to claim 11, wherein the joint has a pair of protrusions protruding at respective sides on the front surface opposite to each other through the front end in a longitudinal direction of the front end, in the direction along which corresponding one of the liquid supply tubes and the liquid discharge tube is guided by the cuneiform space when the corresponding one of the liquid supply tubes and the liquid discharge tube is inserted into the joint so that the corresponding one of the liquid supply tubes and the liquid discharge tube is enabled to penetrate the front surface through the front end.

19. A joint according to claim 18, wherein the protrusions protrude with respect to a part of the front surface overlapping the front end, as seen in the direction along which corresponding one of the liquid supply tubes and the liquid discharge tube is guided by the cuneiform space when the corresponding one of the liquid supply tubes and the liquid discharge tube is inserted into the joint so that the corresponding one of the liquid supply tubes and the liquid discharge tube is enabled to penetrate the front surface through the front end.

20. A joint according to claim 11, wherein the front end forms single line.

* * * * *